US011882397B2

(12) United States Patent
Tie (10) Patent No.: US 11,882,397 B2
(45) Date of Patent: Jan. 23, 2024

(54) NOISE REDUCTION METHOD AND APPARATUS FOR MICROPHONE ARRAY OF EARPHONE, EARPHONE AND TWS EARPHONE

(71) Applicant: Weifang Goertek Microelectronics Co., Ltd., Shandong (CN)

(72) Inventor: Guangpeng Tie, Shandong (CN)

(73) Assignee: Weifang Goertek Microelectronics Co. Ltd., Weifang (CN)

( * ) Notice: Subject to any disclaimer, the term of this patent is extended or adjusted under 35 U.S.C. 154(b) by 205 days.

(21) Appl. No.: 17/620,931

(22) PCT Filed: Sep. 26, 2019

(86) PCT No.: PCT/CN2019/108290
§ 371 (c)(1),
(2) Date: Dec. 20, 2021

(87) PCT Pub. No.: WO2020/252972
PCT Pub. Date: Dec. 24, 2020

(65) Prior Publication Data
US 2022/0360883 A1 Nov. 10, 2022

(30) Foreign Application Priority Data
Jun. 20, 2019 (CN) .......................... 201910536601.7

(51) Int. Cl.
*H04R 1/10* (2006.01)
*H04R 3/00* (2006.01)

(52) U.S. Cl.
CPC ......... *H04R 1/1083* (2013.01); *H04R 1/1016* (2013.01); *H04R 1/1041* (2013.01);
(Continued)

(58) Field of Classification Search
CPC .. H04R 1/1083; H04R 1/1016; H04R 1/1041; H04R 3/005; H04R 2430/21;
(Continued)

(56) References Cited

U.S. PATENT DOCUMENTS 10,397,687 B2 * 8/2019 Watts ................... H04R 1/1041
10,424,315 B1 * 9/2019 Ganeshkumar ...... H04R 1/1008
(Continued)

FOREIGN PATENT DOCUMENTS

CN 107329114 A 11/2017
CN 107770710 A 3/2018
(Continued)

*Primary Examiner* — Jason R Kurr
(74) *Attorney, Agent, or Firm* — Baker Botts LLP (57) ABSTRACT

Disclosed are a noise reduction method for a microphone array of an earphone, an apparatus, and an earphone comprising: acquiring, when an earphone wearer speaks, a first sound signal collected by a bone conduction microphone arranged on the earphone and second sound signals collected respectively by a preset number of microphones arranged on the earphone; determining, according to the first sound signal and the second sound signal, a delay time from a time when the voice signal arrives at each microphone to a time when the voice signal arrives at the bone conduction microphone; computing, according to the delay time, a pointing angle of the microphone array formed by the microphones relative to the wearer's mouth; and adjusting a beam pointing angle of the microphone array according to the pointing angle, such that the microphone array forms a beam by an adjusted beam pointing angle.

9 Claims, 4 Drawing Sheets

(52) U.S. Cl.
CPC ......... *H04R 3/005* (2013.01); *H04R 2430/21* (2013.01); *H04R 2460/13* (2013.01)

(58) Field of Classification Search
CPC .... H04R 2460/13; H04R 1/326; H04R 1/406; H04R 25/40; H04R 25/405; H04R 25/407
See application file for complete search history.

(56) References Cited

U.S. PATENT DOCUMENTS

2014/0093091 A1* 4/2014 Dusan ................ H04R 1/1083
381/74
2018/0227658 A1* 8/2018 Hviid ................. H04R 1/1083

FOREIGN PATENT DOCUMENTS

| CN | 108091344 A | 5/2018 |
| CN | 108882087 A | 11/2018 |
| CN | 110121129 A | 8/2019 |

* cited by examiner

S101 — Acquiring, when a wearer of an earphone is speaking, a first sound signal collected by a bone conduction microphone arranged on the earphone and second sound signals collected respectively by a preset number of microphones arranged on the earphone, wherein the preset number is greater than or equal to two, the first sound signal comprises a voice signal, and the second sound signal comprises a voice signal and a noise signal S102 — Determining, according to the first sound signal and the second sound signal, a delay time from a time when the voice signal arrives at each microphone to a time when the voice signal arrives at the bone conduction microphone S103 — Computing, according to the delay time, a pointing angle of a microphone array formed by the microphones relative to a mouth of the wearer S104 — Adjusting a beam pointing angle of the microphone array according to the pointing angle, such that the microphone array forms a beam by means of an adjusted beam pointing angle

NOISE REDUCTION METHOD AND APPARATUS FOR MICROPHONE ARRAY OF EARPHONE, EARPHONE AND TWS EARPHONE

CROSS-REFERENCE TO RELATED APPLICATION

This application claims priority to Chinese Patent Application No. 201910536601.7, submitted with the Chinese Patent Office on Jun. 20, 2019 and entitled "Noise reduction method and apparatus for microphone array of earphone, earphone and TWS earphone", which is incorporated herein by reference in its entirety.

FIELD OF TECHNOLOGY

The present disclosure relates to the technical field of portable listening devices, and in particular to a noise reduction method and apparatus for a microphone array of an earphone, an earphone and a TWS (true wireless stereo) earphone.

BACKGROUND

With the scientific and technological advances of modern society, earphones are more and more widely used. In order to ensure the call quality when a user wears an earphone, a plurality of microphones are often arranged in the earphone to form a microphone array which is used for forming a beam, so as to reduce noise of a collected sound signal.

In the prior art, when the microphone array is used to form the beam, a fixed beam pointing angle is usually used, for example, when two microphones form a double-microphone array to form a beam, it is believed that the position of each microphone relative to the mouth is fixed, the distance L between the two microphones is fixed, the double-microphone array with the interval L is used to form a beam, and the pointing direction (beam pointing angle) of the array is also fixed. However, when a user wears an earphone actually, the pointing direction of the microphone array will not unchangeably point to the mouth of the user, and since different users have different habits of wearing earphones, the position of the microphone will be changed, such that the pointing direction of the microphone array relative to a mouth will be changed, and in an extreme case, a user will reversely wear an earphone to call, resulting in poor call quality.

Accordingly, it has become a challenge to adaptively adjust the beam pointing angle of the microphone array, reduce the situation of poor phone call quality due to the change of the fixed beam pointing angle relative to the mouth of a user, ensure the noise reduction effect of the microphone array, and improve the user experience.

SUMMARY

The purpose of the present disclosure is to provide a noise reduction method and apparatus for a microphone array of an earphone, an earphone and a TWS (true wireless stereo) earphone, so as to improve a phone call quality of a user, ensure a noise reduction effect of the microphone array and improve user experience by adaptively adjusting a beam pointing angle of the microphone array.

In order to solve the above-mentioned technical problems, the present disclosure provides the noise reduction method for a microphone array of an earphone, which includes:

acquiring, when a wearer of the earphone is speaking, a first sound signal collected by a bone conduction microphone arranged on the earphone and second sound signals collected respectively by a preset number of microphones arranged on the earphone, where the preset number is greater than or equal to two, the first sound signal includes a voice signal, and the second sound signal includes the voice signal and a noise signal;

determining, according to the first sound signal and the second sound signal, a delay time from a time when the voice signal arrives at each microphone to a time when the voice signal arrives at the bone conduction microphone;

computing, according to the delay time, a pointing angle of the microphone array formed by the microphones relative to a mouth of the wearer; and adjusting a beam pointing angle of the microphone array according to the pointing angle, such that the microphone array forms a beam by means of an adjusted beam pointing angle.

Optionally, the step of determining, according to the first sound signal and the second sound signal, a delay time from a time when the voice signal arrives at each microphone to a time when the voice signal arrives at the bone conduction microphone includes:

computing, according to the first sound signal and the second sound signal and by means of a preset cross-correlation function, the delay time from the time when the voice signal arrives at each microphone to the time when the voice signal arrives at the bone conduction microphone.

Optionally, when the preset number is two, the step of computing, according to the first sound signal and the second sound signal and by means of a preset cross-correlation function, the delay time from the time when the voice signal arrives at each microphone to the time when the voice signal arrives at the bone conduction microphone includes:

computing, according to the first sound signal and the second sound signal collected by a first microphone, a first delay time corresponding to a peak point of $\text{corr}(\tau)=\int_{-\infty}^{+\infty}(x^*(t)x_1(t+\tau))$, where the first delay time is a delay time from a time when the voice signal arrives at the first microphone to a time when the voice signal arrives at the bone conduction microphone, $x^*(t)$ is a conjugate of the first sound signal, and $x_1(t)$ is the second sound signal collected by the first microphone; and computing, according to the second sound signal collected by a second microphone and the first sound signal, a second delay time corresponding to a peak point of $\text{corr}(\tau)=\int_{-\infty}^{+\infty}(x^*(t)x_2(t+\tau))$, where the second delay time is a delay time from a time when the voice signal arrives at the second microphone to a time when the voice signal arrives at the bone conduction microphone, and $x_2(t)$ is the second sound signal collected by the second microphone.

Optionally, when the preset number is two, the step of computing, according to the delay time, a pointing angle of the microphone array formed by the microphones relative to a mouth of the wearer includes:

computing, according to the computed first delay time corresponding to the first microphone and the computed second delay time corresponding to the second microphone and by means of $$\theta = \arccos\left(\frac{(t_2 - t_1)c}{L}\right),$$

the pointing angle of the microphone array formed by the first microphone and the second microphone relative to the mouth of the wearer, where θ is the pointing angle, $t_2$ is the second delay time, $t_1$ is the first delay time, L is a distance between the first microphone and the second microphone, and c is a sound speed in air.

Optionally, the step of adjusting a beam pointing angle of the microphone array according to the pointing angle, such that the microphone array forms a beam by means of an adjusted beam pointing angle includes:
  adjusting the beam pointing angle to the pointing angle, such that the microphone array forms the beam by means of the pointing angle.

Optionally, the step of acquiring, when a wearer of the earphone is speaking, a first sound signal collected by a bone conduction microphone arranged on the earphone and second sound signals collected respectively by a preset number of microphones arranged on the earphone includes:
  acquiring a wearing condition of the earphone, where the wearing condition includes a wearing state and a non-wearing state;
  determining whether the wearing condition is the wearing state or not;
  if yes, controlling the bone conduction microphone to collect a sound signal;
  determining whether the wearer is speaking or not according to the sound signal; and
  if yes, controlling the bone conduction microphone to collect the first sound signal and controlling the microphone to collect the second sound signal.

The present disclosure further provides the noise reduction apparatus for a microphone array of an earphone, which includes:
  an acquiring module for acquiring, when a wearer of the earphone is speaking, a first sound signal collected by a bone conduction microphone arranged on the earphone and second sound signals collected respectively by a preset number of microphones arranged on the earphone, where the preset number is greater than or equal to two, the first sound signal includes a voice signal, and the second sound signal includes the voice signal and a noise signal;
  a determining module for determining, according to the first sound signal and the second sound signal, a delay time from a time when the voice signal arrives at each microphone to a time when the voice signal arrives at the bone conduction microphone;
  a computing module for computing, according to the delay time, a pointing angle of the microphone array formed by the microphones relative to a mouth of the wearer; and
  an adjusting module for adjusting a beam pointing angle of the microphone array according to the pointing angle, such that the microphone array forms a beam by means of an adjusted beam pointing angle.

Optionally, the determining module includes:
  a computing sub-module for computing, according to the first sound signal and the second sound signal and by means of a preset cross-correlation function, the delay time from the time when the voice signal arrives at each microphone to the time when the voice signal arrives at the bone conduction microphone.

The present disclosure further provides the earphone, which includes: a memory, a processor, a bone conduction microphone and a preset number of microphones, where the memory is used for storing a computer program, and the processor is used for implementing, when executing the computer program, steps of any one noise reduction method for a microphone array of an earphone mentioned above.

In addition, the present disclosure further provides the TWS earphone, which includes a first wireless earphone and a second wireless earphone, where both the first wireless earphone and the second wireless earphone are the earphone mentioned above.

The noise reduction method for a microphone array of an earphone provided by the present disclosure includes: acquiring, when the wearer of the earphone is speaking, the first sound signal collected by the bone conduction microphone arranged on the earphone and the second sound signals collected respectively by a preset number of microphones arranged on the earphone, where the preset number is greater than or equal to two, the first sound signal includes the voice signal, and the second sound signal includes the voice signal and the noise signal; determining, according to the first sound signal and the second sound signal, the delay time from the time when the voice signal arrives at each microphone to the time when the voice signal arrives at the bone conduction microphone; computing, according to the delay time, the pointing angle of the microphone array formed by the microphones relative to the mouth of the wearer; and adjusting the beam pointing angle of the microphone array according to the pointing angle, such that the microphone array forms the beam by means of the adjusted beam pointing angle.

It can be seen that according to the present disclosure, when a wearer of an earphone is speaking, the bone conduction microphone is used to determine a time delay from a time when each microphone in the microphone array receives the voice signal to a time when the bone conduction microphone receives the voice signal, thereby adaptively adjusting the beam pointing angle of the microphone array, avoiding poor phone call quality due to a change of the fixed beam pointing angle relative to the a mouth of a user, ensuring a noise reduction effect of the microphone array, and improving user experience. In addition, the present disclosure further provides a noise reduction apparatus for a microphone array of an earphone, the earphone and a TWS earphone, which also have the above-mentioned beneficial effects.

BRIEF DESCRIPTION OF THE DRAWINGS

In order to more clearly describe the technical solutions in the embodiments of the present disclosure or in the prior art, a brief introduction to the accompanying drawings required for the description of the embodiments or the prior art will be provided below. Obviously, the accompanying drawings in the following description are merely embodiments of the present disclosure. Those of ordinary skill in the art would also have been able to derive other accompanying drawings from these accompanying drawings without making inventive efforts.

DESCRIPTION OF THE EMBODIMENTS

In order to make the objectives, technical solutions and advantages of the embodiments of the present disclosure more clearly, the technical solutions in the embodiments of the present disclosure will be clearly and completely described below in conjunction with the accompanying drawings in the embodiments of the present disclosure. Obviously, the described embodiments are some, rather than all of the embodiments. On the basis of the embodiments of the present disclosure, all other embodiments acquired by those of ordinary skill in the art without making creative efforts fall within the scope of protection of the present disclosure.

Figure 1:
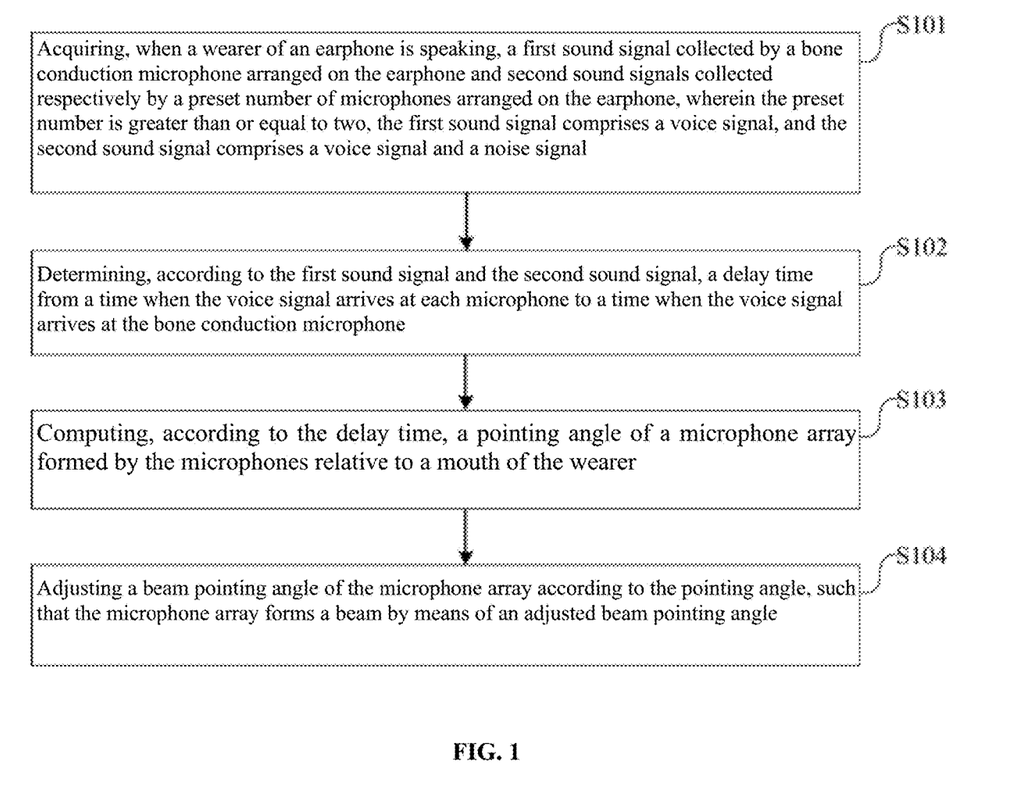
FIG. 1 is a flowchart of a noise reduction method for a microphone array of an earphone provided in the embodiment of the present disclosure.

Referring to FIG. 1, FIG. 1 is a flowchart of a noise reduction method for a microphone array of an earphone provided in the embodiment of the present disclosure. The method may include:

Step 101: acquire, when a wearer of the earphone is speaking, a first sound signal collected by a bone conduction microphone arranged on the earphone and second sound signals collected respectively by a preset number of microphones arranged on the earphone, where the preset number is greater than or equal to two, the first sound signal includes a voice signal, and the second sound signal includes the voice signal and a noise signal.

It can be understood that the purpose of the step may be that a processor in the earphone or a terminal in paired connection to the earphone acquires, when the wearer of the earphone is speaking, the first sound signal collected by the bone conduction microphone arranged on the earphone and the second sound signals collected respectively by a preset number of microphones arranged on the earphone, that is, the processor acquires the first sound signal and the second sound signal, which include the voice signal generated when the wearer is speaking. Since the first sound signal propagated from an interior of a head of the wearer and capable of being collected by the bone conduction microphone (inner ear bone microphone) mainly includes middle and low frequency portions of the voice signal and has few noise, so as to be used as a reference signal for determining the voice signal, such that an interference of external noise may be avoided, and accuracy of identifying the voice signal when the wearer is speaking may be improved.

Specifically, the specific number of the microphones forming the microphone array arranged on the earphone in the embodiment, that is, a specific numerical value of the preset number, may be autonomously set by a designer according to practical scenes and user requirements. Two microphones may be arranged to form a double-microphone array, that is, the preset number may be two; or more microphones may be arranged to form a corresponding array, that is, the preset number may be greater than two, the embodiment does not limit this in any way.

Correspondingly, the first sound signal in the step may be a sound signal (vibration signal) collected by the bone conduction microphone when the wearer of the earphone is speaking. The second sound signal in the step may be a sound signal (vibration signal) collected by each microphone when the wearer of the earphone is speaking.

It should be noted that a specific manner of the processor to acquire the first sound signal and the second sound signal in the embodiment may be set by a designer according to use scenes and user requirements. For example, the processor may acquire the first sound signal and the second sound signal when a user (wearer) is speaking for the first time after the user wears the earphone, that is, after the user wears the earphone each time, a corresponding beam pointing angle of the microphone array at this time of wearing is adjusted. The processor may also acquire the first sound signal and the second sound signal at a preset time interval after the user wears the earphone each time. For example, after the user wears the earphone each time, the beam pointing angle of the microphone array is adjusted in real time according to the first sound signal and the second sound signal which are acquired in real time when the user is speaking. As long as the processor may acquire the first sound signal and the second sound signal, which include the corresponding voice signal when the wearer of the earphone is speaking, the embodiment does not limit this in any way.

A specific process of the processor to acquire the first sound signal and the second sound signal in the embodiment may be autonomously set by a designer. For example, whether the earphone is being worn or not and whether the wearer is speaking or not may be determined separately, such that when the earphone is being worn and the wearer is speaking, the bone conduction microphone and a preset number of microphones are controlled to be started to collect the first sound signal and the second sound signal. As long as it can be guaranteed that the first sound signal and the second sound signal acquired by the processor may both include the corresponding voice signal when the wearer of the earphone is speaking, the embodiment does not limit this in any way.

Specifically, a specific manner that the processor determines whether the earphone is being worn or not and whether the wearer is speaking or not may be autonomously set by a designer. For example, sensor devices such as a distance sensor, a light sensor and an acceleration sensor on the earphone may be used to detect the wearing condition of the earphone, so as to determine whether the earphone wearing condition is a wearing state or not. The sound signal collected by the bone conduction microphone may be used to determine whether the wearer is speaking or not. That is, the step may include: acquire the wearing condition of the earphone, where the wearing condition includes the wearing state and a non-wearing state; determine whether the wearing condition is the wearing state or not; if yes, control the bone conduction microphone to collect the sound signal; determine whether the wearer is speaking or not according to the sound signal; and if yes, control the bone conduction microphone to collect the first sound signal and controlling the microphone to collect the second sound signal. As long as the processor may determine whether the earphone is being worn or not and whether the wearer is speaking or not, the embodiment does not limit this in any way.

Correspondingly, if the wearing condition of the earphone is the non-wearing state and the wearer is not speaking, the process may be directly finished; or the step of acquiring the wearing condition of the earphone may be repeated for determination again, and the embodiment does not limit this in any way.

Step 102: determine, according to the first sound signal and the second sound signal, a delay time from a time when the voice signal arrives at each microphone to a time when the voice signal arrives at the bone conduction microphone.

It can be understood that the purpose of the step may be to determine, according to the first sound signal collected by the bone conduction microphone and the second sound signals collected respectively by the preset number of microphones when the wearer of the earphone is speaking, the delay time from the time when the voice signal arrives at each microphone to the time when the voice signal arrives at the bone conduction microphone when the wearer is speaking, that is, to determine a time difference between a time when the same voice signal is at each second sound signal and a time when the same voice signal is at the first sound signal.

Correspondingly, a specific manner of the processor to determine, according to the first sound signal and the preset number of second sound signals, the delay time from the time when the voice signal arrives at each microphone to the time when the voice signal arrives at the bone conduction microphone in the step may be autonomously set by a designer. For example, a time difference between a time when the same voice signal is in the first sound signal and a time when the same voice signal is in each second sound signal may be determined by identifying and detecting the voice signal in the first sound signal and each second sound signal. The time difference between the time when the same voice signal is in the first sound signal and the time when the same voice signal is in each second sound signal may also be computed by directly using a cross-correlation function, that is, the first sound signal and each second sound signal are correlated, cross-correlation mainly refers to similarity between two columns of signals, where one column of signals has a time delay compared with the other column of signals. A cross-correlation function of the two columns of signals is computed, and a time (time delay) corresponding to a most similar moment, that is, a peak point of the cross-correlation function is computed. That is, the step may include the step of computing, according to the first sound signal and a preset number of second sound signals and by means of the preset cross-correlation function, the delay time from the time when the voice signal arrives at each microphone to the time when the voice signal arrives at the bone conduction microphone. The embodiment does not limit this in any way.

Figure 2:
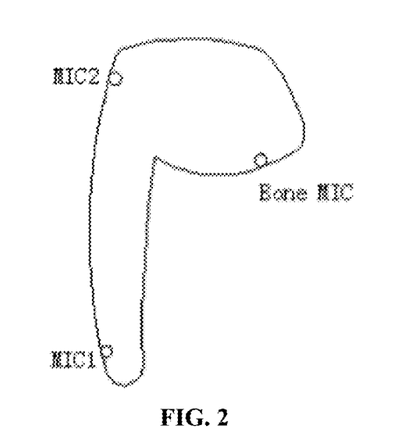
FIG. 2 is a schematic structural diagram of an earphone provided in the embodiment of the present disclosure.

Specifically, a specific process of computing, according to the first sound signal and a preset number of second sound signals and by means of the preset cross-correlation function, the delay time from the time when the voice signal arrives at each microphone to the time when the voice signal arrives at the bone conduction microphone may be autonomously set by a designer. For example, the time (delay time) corresponding to the peak point of each preset cross-correlation function may be computed by means of a preset cross-correlation function of the bone conduction microphone corresponding to each microphone. For example, when the preset number is two, as shown in FIG. 2, when the earphone is provided with a first microphone (MIC1) and a second microphone (MIC2), a first delay time $t_1$ corresponding to a peak point of $corr(\tau)=\int_{-\infty}^{+\infty}(x^*(t)x_1(t+\tau))$ is computed according to a first sound signal and a second sound signal collected by the first microphone, that is, a time point $\tau$ corresponding to the peak point of $corr(\tau)=\int_{-\infty}^{+\infty}(x^*(t)x_1(t+\tau))$ is equal to $t_1$, where the first delay time is a delay time from a time when the voice signal arrives at the first microphone to a time when the voice signal arrives at the bone conduction microphone (Bone MIC), $x^*(t)$ is a conjugate of the first sound signal, and $x_1(t)$ is the second sound signal collected by the first microphone. A second delay time $t_2$ corresponding to a peak point of $corr(\tau)=\int_{-\infty}^{+\infty}(x^*(t)x_2(t+\tau))$ is computed according to the first sound signal and a second sound signal collected by the second microphone, that is, a time point $\tau$ corresponding to the peak point of $corr(\tau)=\int_{-\infty}^{+\infty}(x^*(t)x_2(t+\tau))$ is equal to $t_2$, where the second delay time is a delay time from a time when the voice signal arrives at the second microphone to a time when the voice signal arrives at the bone conduction microphone, and $x_2(t)$ is the second sound signal collected by the second microphone. The embodiment does not limit this in any way.

Step 103: compute, according to the delay time, a pointing angle of the microphone array formed by the microphones relative to a mouth of the wearer.

It can be understood that the purpose of the step may be that the delay time from the time when the voice signal arrives at each microphone to the time when the voice signal arrives at the bone conduction microphone may be used to determine a delay difference between times when the voice signal arrives at the microphones, and to compute the pointing angle of the microphone array formed by a preset number of microphones relative to the mouth of the wearer.

Correspondingly, a specific manner of the processor to compute the pointing angle of the microphone array formed by the microphones relative to the mouth of the wearer according to the delay time in the step may be autonomously set by a designer. For example, when the preset number is two, a delay time difference $\Delta t$ (such as, $t_2-t_1$) between the time when the voice signal arrives at the first microphone and the time when the voice signal arrives at the second microphone may be determined according to the computed delay time (first delay time $t_1$) from the time when the voice signal arrives at the first microphone to the time when the voice signal arrives at the bone conduction microphone and the computed delay time (second delay time $t_2$) from the time when the voice signal arrives at the second microphone to the time when the voice signal arrives at the bone conduction microphone, such that the pointing angle of the microphone array formed by the first microphone and the second microphone relative to the mouth of the wearer is computed by means of the delay time difference. The embodiment does not limit this in any way.

For example, when the preset number is two, the step may include: compute, according to the computed first delay time corresponding to the first microphone and the computed second delay time corresponding to the second microphone and by means of $$\theta = \arccos\left(\frac{(t_2-t_1)c}{L}\right),$$

the pointing angle of the microphone array formed by the first microphone and the second microphone relative to the mouth of the wearer, where $\theta$ is the pointing angle of the microphone array formed by the first microphone and the second microphone relative to the mouth of the wearer, $t_2$ is the second delay time, $t_1$ is the first delay time, L is a distance between the first microphone and the second microphone, and c is a preset speed value, such as a sound speed in air.

Step 104: adjust a beam pointing angle of the microphone array according to the pointing angle, such that the microphone array forms a beam by means of an adjusted beam pointing angle.

It can be understood that the purpose of the step may be to adjust the beam pointing angle of the microphone array by computing the pointing angle of the microphone array relative to the mouth of the wearer, so as to realize self-adaptation of the beam pointing angle of the microphone array, such that the microphone array may form a beam by adopting the adjusted beam pointing angle, and a noise reduction effect when the microphone array is used for forming the beam is ensured.

Figure 3:
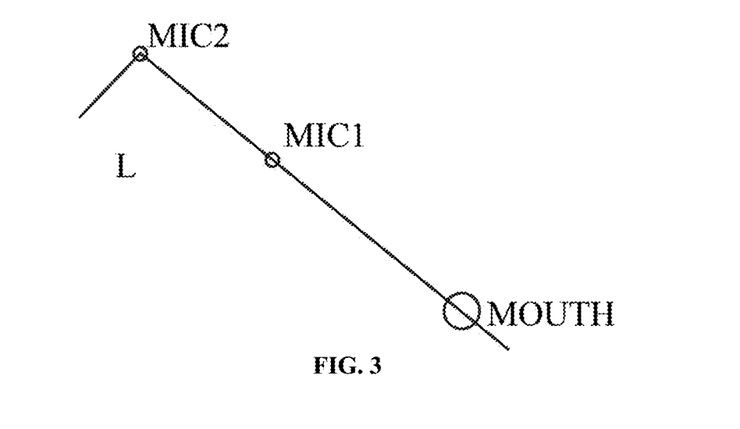
FIG. 3 is a schematic diagram of a position of a microphone of an earphone and a position of a mouth of a wearer provided in the embodiment of the present disclosure.
Figure 4:
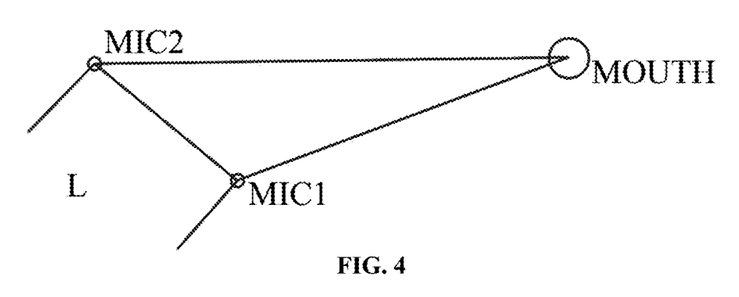
FIG. 4 is a schematic diagram of a position of a microphone of another earphone and a position of a mouth of a wearer provided in the embodiment of the present disclosure.
Figure 5:
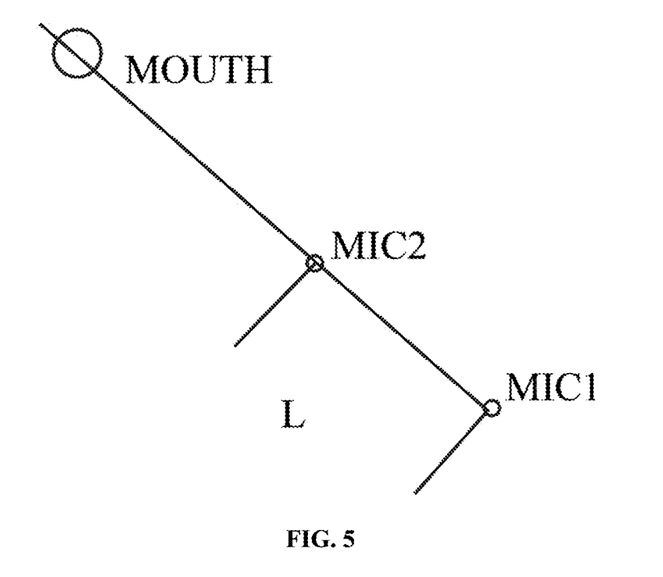
FIG. 5 is a schematic diagram of a position of a microphone of another earphone and a position of a mouth of a wearer provided in the embodiment of the present disclosure.

Specifically, a specific manner of the processor to adjust the beam pointing angle of the microphone array according to the pointing angle in the step may be autonomously set by a designer. For example, the beam pointing angle may be directly adjusted to the pointing angle, such that the microphone array forms the beam by means of the pointing angle. As shown in FIGS. 3-5, when the preset number is two and the microphone array formed by the first microphone (MIC1) and the second microphone (MIC2) is used to form the beam, a difference ($t_2-t_1$) between a sound propagation distance between the voice signal emitted by the mouth of the wearer and the first microphone and a sound propagation distance between the voice signal emitted by the mouth of the wearer and the second microphone is c. When the sound propagation distance difference is a positive value (as shown in FIGS. 3 and 4), the MIC1 is closer to the mouth, and when the sound propagation distance difference is a negative value (as shown in FIG. 5), the MIC2 is closer to the mouth. The beam pointing angle $$\theta = \arccos\left(\frac{(t_2 - t_1)c}{L}\right)$$

of the microphone array is directly adjusted according to the computed delay time ($t_2$ and $t_1$); or when an absolute value of the pointing angle is greater than a preset value, the beam pointing angle is adjusted to the pointing angle, and as long as the pointing angle of the microphone array relative to the mouth of the wearer may be used to adjust the beam pointing angle of the microphone array, the embodiment does not limit this in any way.

It can be understood that in the embodiment, the voice signal, which is collected by the bone conduction microphone and not prone to be interfered by external noise, is taken as a reference to determine the difference (time delay) between the time when the voice signal arrives at each microphone and the time when the voice signal arrives at the bone conduction microphones, that is, a time difference between the times when the voice signal arrives at the microphones may be acquired, such that the pointing angle of the microphone array formed by the preset number of microphones relative to the mouth of the wearer may be computed, so as to adjust the beam pointing angle when the microphone array forms the beam.

In the embodiment of the present disclosure, when the wearer of the earphone is speaking, the bone conduction microphone is used to determine a time delay from a time when each microphone in the microphone array receives the voice signal to a time when the bone conduction microphone receives the voice signal, thereby adaptively adjusting the beam pointing angle of the microphone array, avoiding a situation of poor phone call quality due to a change of a fixed beam pointing angle relative to a mouth of a user, ensuring a noise reduction effect of the microphone array, and improving user experience.

Figure 6:
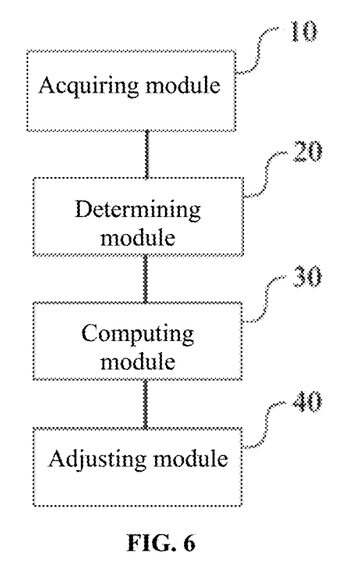
FIG. 6 is a structural block diagram of a noise reduction apparatus for a microphone array of an earphone provided in the embodiment of the present disclosure.

Referring to FIG. 6, FIG. 6 is a structural block diagram of a noise reduction apparatus for a microphone array of an earphone provided in the embodiment of the present disclosure. The apparatus may include:

An acquiring module 10 for acquiring, when a wearer of the earphone is speaking, a first sound signal collected by a bone conduction microphone arranged on the earphone and second sound signals collected respectively by a preset number of microphones arranged on the earphone, where the preset number is greater than or equal to two, the first sound signal includes a voice signal, and the second sound signal includes the voice signal and a noise signal.

A determining module 20 for determining, according to the first sound signal and the second sound signal, a delay time from a time when the voice signal arrives at each microphone to a time when the voice signal arrives at the bone conduction microphone.

A computing module 30 for computing, according to the delay time, a pointing angle of the microphone array formed by the microphones relative to a mouth of the wearer.

An adjusting module 40 for adjusting a beam pointing angle of the microphone array according to the pointing angle, such that the microphone array forms a beam by means of an adjusted beam pointing angle.

Optionally, the determining module 20 may include:
a computing sub-module for computing, according to the first sound signal and the second sound signal and by means of a preset cross-correlation function, the delay time from the time when the voice signal arrives at each microphone to the time when the voice signal arrives at the bone conduction microphone.

Optionally, when the preset number is two, the computing sub-module may be specifically used for computing the first delay time corresponding to a peak point of corr($\tau$)=$\int_{-\infty}^{+\infty}$(x*(t)x$_1$(t+$\tau$)) according to the first sound signal and the second sound signal collected by the first microphone, where a first delay time is a delay time from a time when the voice signal arrives at the first microphone to the time when the voice signal arrives at the bone conduction microphone, x*(t) is a conjugate of the first sound signal, x$_1$(t) is the second sound signal collected by the first microphone; and computing a second delay time corresponding to a peak point of corr($\tau$)=$\int_{-\infty}^{+\infty}$(x*(t)x$_1$(t+$\tau$)) according to the first sound signal and the second sound signal collected by the second microphone, where the second delay time is a delay time from a time when the voice signal arrives at the second microphone to a time when the voice signal arrives at the bone conduction microphone, and x$_2$(t) is the second sound signal collected by the second microphone.

Optionally, when the preset number is two, the computing module 30 may include:
a pointing angle computing sub-module for computing, according to the computed first delay time corresponding to the first microphone and the computed second delay time corresponding to the second microphone and by means of $$\theta = \arccos\left(\frac{(t_2 - t_1)c}{L}\right),$$

the pointing angle of the microphone array formed by the first microphone and the second microphone relative to the mouth of the wearer, where θ is the pointing angle, $t_2$ is the second delay time, $t_1$ is the first delay time, L is a distance between the first microphone and the second microphone, and c is a sound speed in air.

Optionally, the adjusting module 40 may include:
an adjusting sub-module for adjusting the beam pointing angle to the pointing angle, such that the microphone array forms the beam by means of the pointing angle.

Optionally, the acquiring module 10 may include:
an acquiring sub-module for acquiring a wearing condition of the earphone, where the wearing condition includes a wearing state and a non-wearing state;
a first determining sub-module for determining whether the wearing condition is the wearing state or not;
a first control sub-module for controlling the bone conduction microphone to collect a sound signal if the wearing condition is the wearing state;
a second determining sub-module for determining whether the wearer is speaking or not according to the sound signal; and
a second control sub-module for controlling the bone conduction microphone to collect the first sound signal and controlling the microphone to collect the second sound signal if the wearer is speaking.

In the embodiment of the present disclosure, when the wearer of the earphone is speaking, the bone conduction microphone is used to determine the time delay from the time when each microphone in the microphone array receives the voice signal to the time when the bone conduction microphone receives the voice signal, thereby adaptively adjusting the beam pointing angle of the microphone array, avoiding the situation of poor phone call quality due to the change of the fixed beam pointing angle relative to the mouth of the user, ensuring the noise reduction effect of the microphone array, and improving the user experience.

The embodiment of the present disclosure further provides an earphone, which includes: a memory, a processor, a bone conduction microphone and a preset number of microphones, where the memory is used for storing a computer program, and the processor is used for implementing, when executing the computer program, steps of the noise reduction method for a microphone array of an earphone provided in the above embodiments.

In addition, the present disclosure further provides a TWS (true wireless stereo) earphone, which includes a first wireless earphone and a second wireless earphone, where both the first wireless earphone and the second wireless earphone are the earphone provided in the above embodiment.

Each embodiment of the description is described in a progressive manner, each embodiment focuses on the differences from other embodiments, and the same and similar parts between the embodiments can refer to each other. Since the apparatus, the earphone and the TWS earphone disclosed in the embodiments correspond to a method disclosed in the embodiments, its description is relatively simple, and relevant contents may be seen from partial description of the method.

Those skilled in the art should be able to further acknowledge that the units and algorithm steps of the various examples described with reference to the embodiments disclosed herein can be implemented in electronic hardware, computer software or a combination of both. To clearly illustrate the interchangeability of hardware and software, the compositions and steps of the various examples have been generally described in terms of functionality in the above description. Whether these functions are performed in hardware or software depends on the specific application and design constraints of the technical solution. Those skilled in the art can use different methods to implement the described functions for each particular application, but such implementation should not be considered to be beyond the scope of the present disclosure.

The steps of a method or algorithm described in connection with the embodiments disclosed herein may be implemented directly in hardware, in a software module executed by a processor, or in a combination of the two. The software module may be placed in a random access memory (RAM), a memory, a read-only memory (ROM), an electrically programmable ROM, an electrically erasable programmable ROM, a register, a hard disc, a removable disc, a compact disc read-only memory (CD-ROM), or any other form of storage medium known in the art.

The noise reduction method and apparatus for a microphone array of an earphone, an earphone and a TWS earphone provided in the present disclosure are described in detail above. Specific embodiments are used for illustrating principles and implementations of the present disclosure herein. The description of the embodiments above is only used for helping understand the method and its core concept of the present disclosure. It should be noted that several improvements and modifications may also be made by those of ordinary skill in the art without departing from the principles of the present disclosure, which also fall within the scope of protection of the present disclosure.

What is claimed is:

1. A noise reduction method for a microphone array of an earphone to be worn by a wearer, comprising:
   acquiring, when the wearer of the earphone speaks, a first sound signal collected by a bone conduction microphone arranged on the earphone and second sound signals collected by two or more microphones arranged on the earphone, wherein the first sound signal comprises a voice signal, and the second sound signal comprises the voice signal and a noise signal;
   determining, according to the first sound signal and the second sound signal, a delay time between a time when the voice signal arrives at each microphone to a time when the voice signal arrives at the bone conduction microphone;
   computing, according to the delay time, a pointing angle of the microphone array formed by the microphones relative to a mouth of the wearer; and
   adjusting a beam pointing angle of the microphone array according to the pointing angle, such that the microphone array forms a beam by an adjusted beam pointing angle.

2. The noise reduction method of claim 1, wherein the determining comprises:
   computing, according to the first sound signal and the second sound signal and a preset cross-correlation function, the delay time from the time when the voice signal arrives at each microphone to the time when the voice signal arrives at the bone conduction microphone.

3. The noise reduction method of claim 2, wherein when the two or more microphones comprises two microphones, and wherein the determining comprises:
   computing, according to the first sound signal and the second sound signal collected by a first microphone, a first delay time corresponding to a peak point of $corr(\tau)=\int_{-\infty}^{+\infty}(x^*(t)x_1(t+\tau))$, wherein the first delay time is a delay time from a time when the voice signal arrives at the first microphone to a time when the voice signal arrives at the bone conduction microphone, $x^*(t)$ is a conjugate of the first sound signal, and $x_1(t)$ is the second sound signal collected by the first microphone; and computing, according to the second sound signal collected by a second microphone and the first sound signal, a second delay time corresponding to a peak point of $corr(\tau)=\int_{-\infty}^{+\infty}(x^*(t)x_2(t+\tau))$, wherein the second delay time is a delay time from a time when the voice signal arrives at the second microphone to a time when the voice signal arrives at the bone conduction microphone, and $x_2(\tau)$ is the second sound signal collected by the second microphone.

4. The noise reduction method of claim 1, wherein when the two or more microphones comprises two microphones, and wherein the computing comprises:

computing, according to the computed first delay time corresponding to the first microphone and the computed second delay time corresponding to the second microphone and by means of $$\theta = \arccos\left(\frac{(t_2 - t_1)c}{L}\right),$$

the pointing angle of the microphone array formed by the first microphone and the second microphone relative to the mouth of the wearer, wherein $\theta$ is the pointing angle, $t_2$ is the second delay time, $t_1$ is the first delay time, L is a distance between the first microphone and the second microphone, and c is a sound speed in air.

5. The noise reduction method of claim 1, wherein the adjusting comprises:

adjusting the beam pointing angle to the pointing angle, such that the microphone array forms the beam by the pointing angle.

6. The noise reduction method of claim 1, wherein the acquiring comprises:

acquiring a wearing condition of the earphone, wherein the wearing condition comprises a wearing state and a non-wearing state;

determining whether the wearing condition is the wearing state; and if in the wearing state, controlling the hone conduction microphone to collect a sound signal;

determining whether the wearer is speaking according to the sound signal, and if the wearer is speaking, controlling the bone conduction microphone to collect the first sound signal and controlling the microphone to collect the second sound signal.

7. An earphone, comprising:
a memory,
a processor,
a bone conduction microphone, and
two or more microphones,
wherein the memory is configured for storing a computer program, and
the processor is configured for implementing, when executing the computer program, the noise reduction method of claim 1.

8. A noise reduction apparatus for a microphone array of an earphone to be worn by a wearer, comprising:

an acquiring module for acquiring, when the wearer of the earphone is speaking, a first sound signal collected by a bone conduction microphone arranged on the earphone and second sound signals collected by two or more microphones arranged on the earphone, where the first sound signal includes a voice signal, and the second sound signal includes the voice signal and a noise signal;

a determining module, coupled to the acquiring module for determining, according to the first sound signal and the second sound signal, a delay time between a time when the voice signal arrives at each microphone to a time when the voice signal arrives at the bone conduction microphone;

a computing module, coupled to the determining module for computing, according to the delay time, a pointing angle of the microphone array formed by the microphones relative to a mouth of the wearer; and an adjusting module coupled to the computing module for adjusting a beam pointing angle of the microphone array according to the pointing angle, such that the microphone array forms a beam by an adjusted beam pointing angle.

9. The noise reduction apparatus of claim 8, wherein the determining module comprises:

a computing sub-module for computing, according to the first sound signal and the second sound signal and by a preset cross-correlation function, the delay time from the time when the voice signal arrives at each microphone to the time when the voice signal arrives at the bone conduction microphone.

* * * * *